United States Patent [19]

Pataki

[11] 4,128,159
[45] Dec. 5, 1978

[54] APPARATUS FOR FEEDING AND ORIENTING PARTS

[76] Inventor: William V. Pataki, 7399 Marywood Dr., Newburgh, Ind. 47630

[21] Appl. No.: 863,263

[22] Filed: Dec. 22, 1977

[51] Int. Cl.² .............................................. B65G 47/24
[52] U.S. Cl. ..................................... 198/389; 198/392
[58] Field of Search ................ 198/389, 392; 221/171, 221/172

[56] References Cited

U.S. PATENT DOCUMENTS

| 2,857,039 | 10/1958 | Whitecar | 198/392 |
| 3,613,861 | 10/1971 | Whitecar | 198/392 |
| 3,817,423 | 6/1974 | McKnight | 198/392 |

*Primary Examiner*—Allen N. Knowles
*Attorney, Agent, or Firm*—Paul & Paul

[57] ABSTRACT

Apparatus for feeding and orienting parts such as studs to production machines such as threaders for work on the parts, comprises an indexing dial having a plurality of radially aligned pockets for receiving the parts. A plurality of feed stations adjacent the indexing dial eject parts into the dial pockets in a desired sequence such that successive parts are ejected from different feed stations into a succession of dial pockets. Each pocket receives but one part during a single rotation of the dial, and each pocket is provided with means for orienting the part into a desired position for ejection onto a track for transporting the part to the production machine.

12 Claims, 14 Drawing Figures

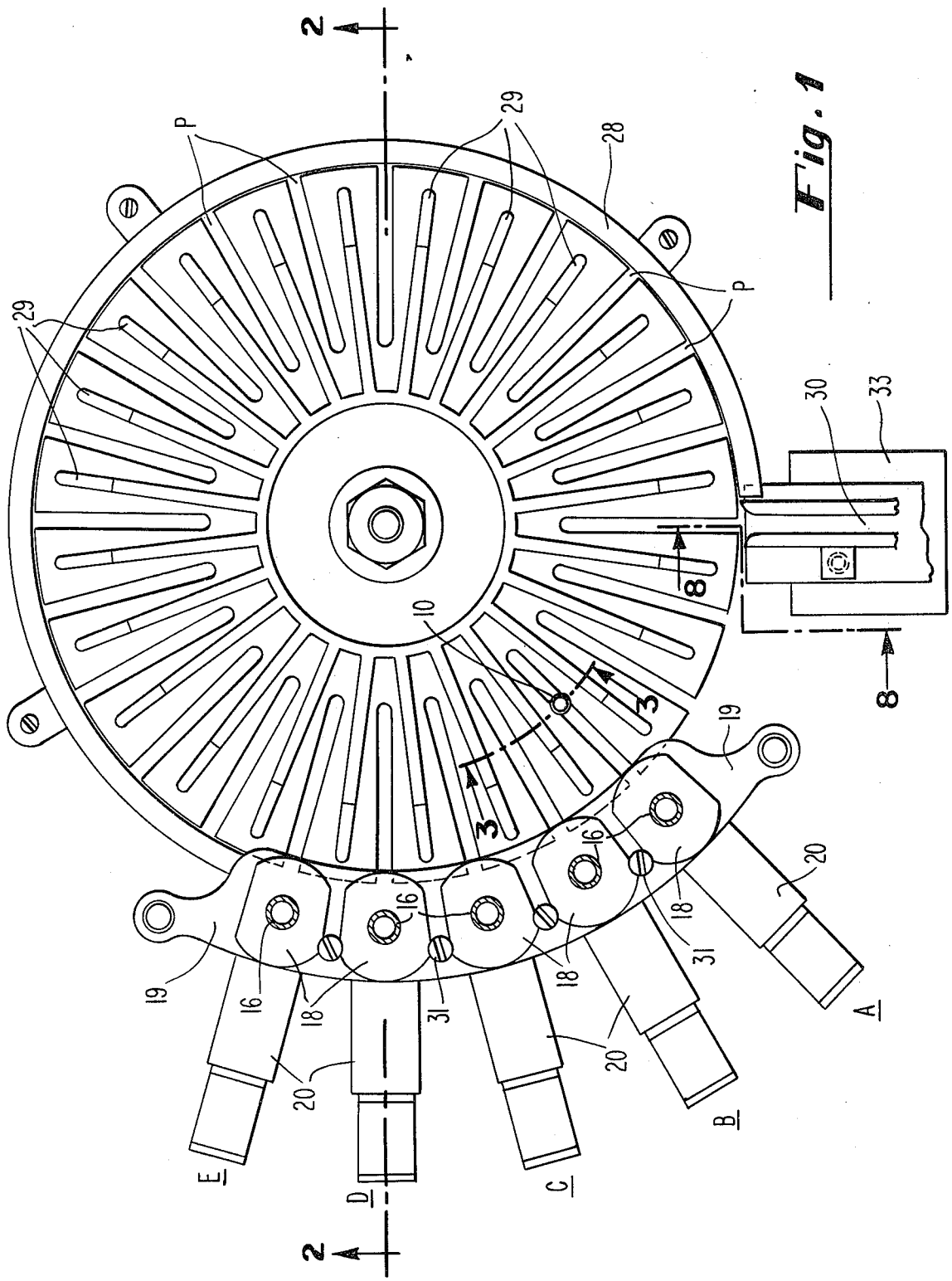

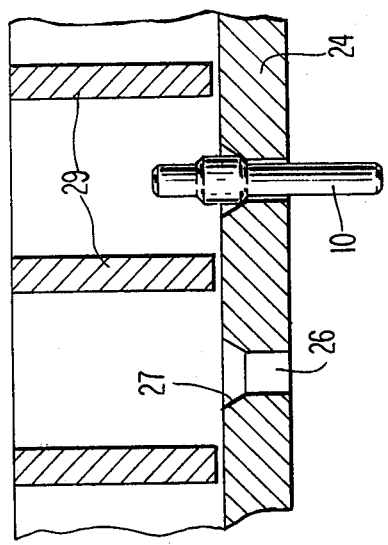
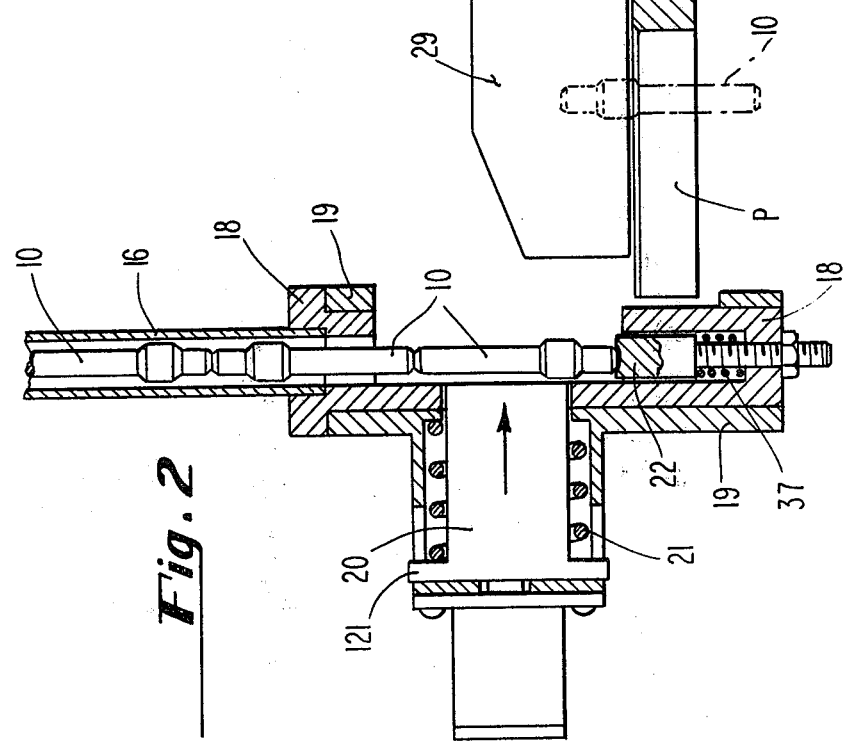

APPARATUS FOR FEEDING AND ORIENTING PARTS

BACKGROUND OF THE INVENTION

The present invention relates to apparatus for orienting and feeding studs or other elongated parts, hereinafter referred to as parts, to production and/or working machines, such as thread rollers, grinders, slotters, etc.

In some prior art methods and apparatus, the parts have been manually oriented and then placed directly into the working tools of the production machine. In other prior art methods and apparatus, the parts, after manual orientation, have been placed into a tube which longitudinally directs the flow of the parts into the production machine or working tools.

The prior art has also utilized somewhat more automatic methods, such as some sort of automatic feeding device which generates the movement of the parts and moves the parts longitudinally end-to-end randomly oriented into a tube-like device which is used to transport the parts from the feeding apparatus to the working tools. At the working tools, various mechanical methods have been employed to strip the parts from the tube and place them into the working tool. In such prior art automatic equipment, the speed at which the parts fall into position for stripping by the mechanical stripper is controlled by the force of gravity and hence the speed of operation is limited. A typical feed rate, for example, is 30 parts per minute.

SUMMARY OF THE INVENTION

A principal object of the present invention is to provide apparatus for automatically orienting and feeding studs to production machines, such as thread rollers, grinders, slotters, etc., at feed rates which are substantially higher than those of the prior art.

BRIEF DESCRIPTION OF THE DRAWINGS

FIG. 1 is a simplified plan view of apparatus incorporating the present invention.

FIG. 2 is an elevational view, in section, looking along the line 2—2 of FIG. 1.

FIG. 3 is a view looking along the line 3—3 of FIG. 1.

DETAILED DESCRIPTION OF THE PREFERRED EMBODIMENTS

Figure 4:
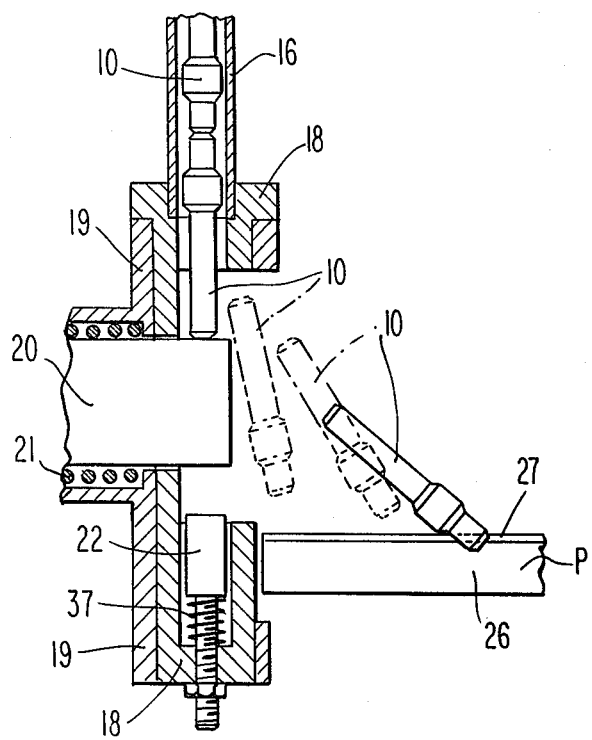
FIGS. 4–8 are a series of views illustrating a part being ejected from the mouth of a feed tube (FIG. 4) into one of the radial pockets in the indexing dial, after which the part is caused to orient itself in the pocket (FIGS. 5–7) before it is ejected from the indexing dial (FIG. 8).

While the apparatus of the present invention may be employed for feeding and orienting parts other than studs, it will be convenient to describe the apparatus as used for feeding and orienting non-symmetrical headless studs to a work machine, such as a threading machine. Such a stud, identified 10, is illustrated in FIGS. 2–8.

A conventional feeding device tooled for multi-track feeding is used to deliver the parts, aligned end-to-end, and randomly oriented, on parallel feeder tracks (not shown) which lead to and terminate at the input ends of a plurality, such as five, flexible feed tubes which bend from a generally horizontal position to a vertical position. The lower ends of five such feed tubes identified by the reference numeral 16 are seen in section in FIG. 1. The elevation of the feeder device is at a higher level than the device used to merge and orient the parts 10, and, accordingly, the back pressure caused by the feeding device, and the gravitational forces acting on the parts 10, promotes movement and flow the parts along the tracks (not shown) and down through the flexible feed tubes 16.

FIG. 2 is an elevational view showing the lower discharge end of one of the feed tubes 16. All five of the feed tubes are similarly connected and mounted and only one need be described.

As seen in FIG. 2, the lower end of the flexible tube 16 is secured to a staging tube 18 having a frontal opening. Each staging tube 18 is secured in a merging block 19 which is, as best seen in FIG. 1, is precisely positioned to insure proper angular alignment with indexing dial 24. The center-line distance from indexing dial 24 to merging block 19 is fixed but the elevation of merging block 19 with respect to the top of indexing dial 24 can be adjusted by moving block 19 up or down on merging-block guide pins (not shown). This adjustment is desirable to insure that each part 10 has a proper trajectory as it is ejected from staging tube 18 onto indexing dial 24. Each staging tube 18 is held in position by means of holddown screws 31.

At the bottom of staging tube 18, there is an elevating plug 22 which serves two functions. One function is to provide for fine elevational adjustment to position the full length of part 10 in proper relation to the staging tube 18 so that the top of part 10 is not obstructed by the top frontal opening in staging 18. It will be apparent that if the length of part 10 is changed, the position of elevating plug 22 must be changed so that part 10 is properly positioned for ejection through the opening in staging tube 18.

A second function of elevating plug 22 is to serve as a shock absorber to minimize the bounce of the part 10 when it falls down into position. A compression spring 37 is positioned under the shoulder of plug 22. Spring 37 absorbs the energy of the falling part 10 and minimizes bounce. Plug 22 is preferably provided with a concave surface at its top. This serves to keep the part 10, which is resting on the plug 22, centered in the staging tube 18.

Once the part 10 has moved into position through feed tube 16 and staging tube 18 and is resting on the top of elevating plug 22, a solenoid (or other suitable actuating element) associated with a particular ejection finger 20 will be actuated to move finger 20 from its normal retracted position toward the part 10 to strip the part 10 from the staging tube 18 and project it into a pocket P in indexing dial 24. Each ejection or knock-out finger 20 is normally maintained in retracted position by a compression spring 21, or other suitable means of retraction. Spring 21 bears against a flange 121 of the finger.

As soon as a part 10 is ejected from staging tube 18 by a knock-out finger 20, the next succeeding part 10, which had been resting directly on top of the part 10 which has now been ejected, will fall downwardly and come to rest on top of the still projecting knock-out finger 20 until such time as the finger 20 is retracted. When the finger is retracted, the succeeding part 10 will fall further and come to rest on the concave top of elevating 22.

The process described above is repeated in each of the five staging tubes 18 in such sequence as to allow maximum time for the following part 10 to fall into position and without ejecting two separate parts 10 from two different staging tubes 18 into the same pocket P of indexing dial 24 during one revolution.

It will be understood that while five feed tubes 16 and five staging tubes 18 is a preferred number, some other number of tubes may be desirable in certain cases. In describing the operation of the apparatus, it will be convenient to identify the five staging positions as A, B, C, D, and E.

Figure 9:
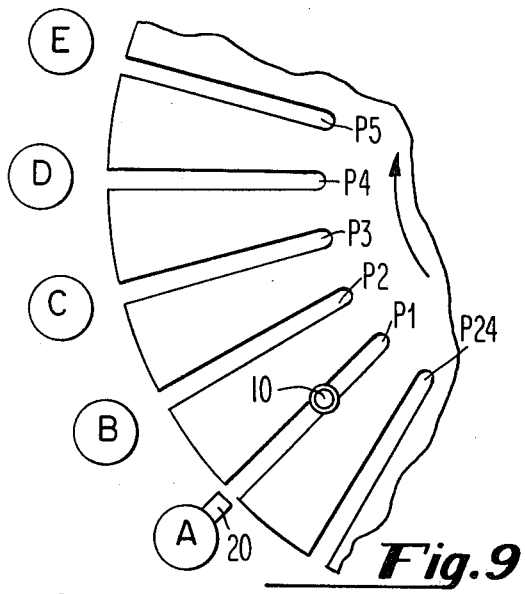
FIGS. 9–13 are a series of views illustrating the sequential action of the apparatus in ejecting parts into the pockets of the indexing dial.
Figure 12:
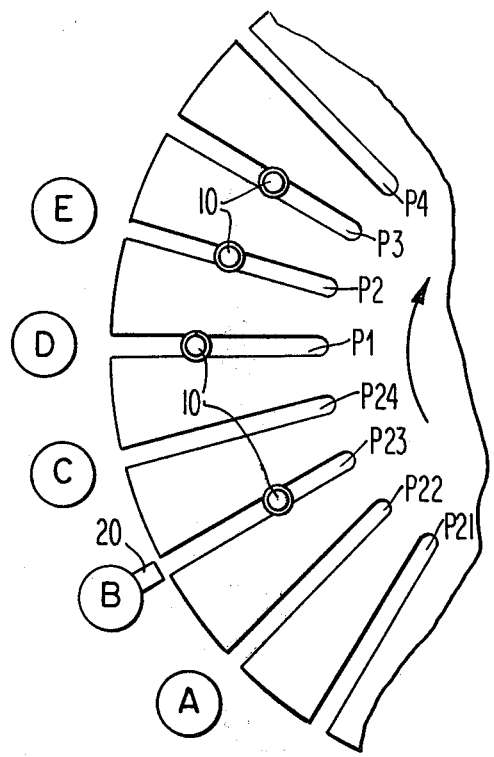
Figure 10:
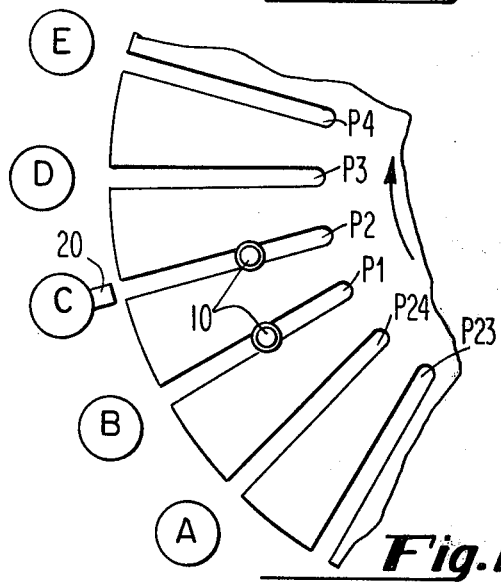
Figure 11:
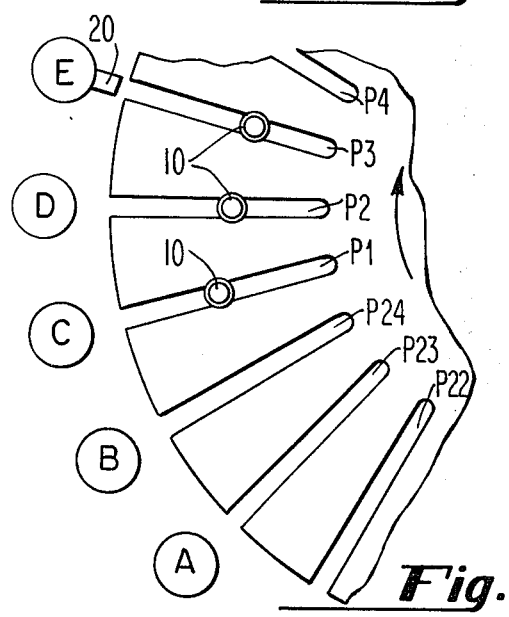
Figure 13:
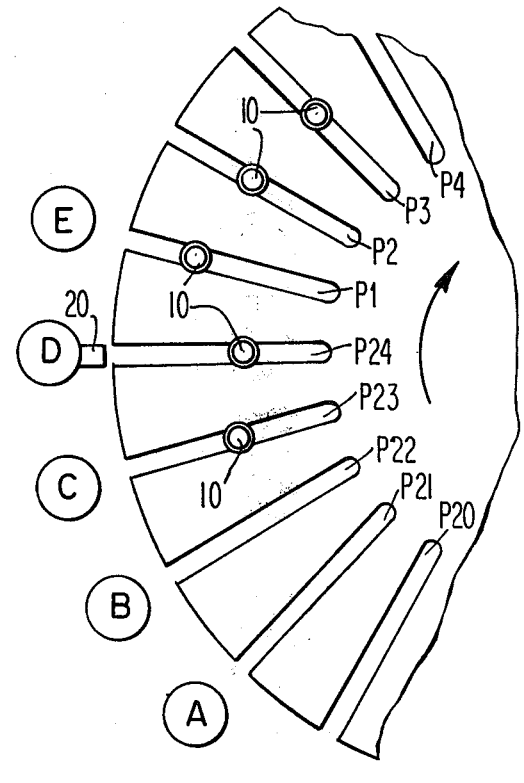

Dial 24 is illustrated as provided with 24 pockets P radially positioned at 15° spacing. These 24 pockets P will be identified as P1 through P24. A desirable sequence of ejections of the parts 10 from the five staging tubes which will allow for maximum time between ejections from the same staging tube, without ejecting two parts 10 into the same pocket 25, is a sequence of A-C-E-B-D. This sequence is illustrated in FIGS. 9-13. For example, a first part 10 from staging tube 18 at Position A is ejected into pocket P1 of indexing dial 24. This is illustrated in FIG. 9. Dial 24 then indexes 15°, clockwise as viewed in FIGS. 2 and 9-13. A second part 10 is next ejected from the staging tube at Position C into pocket P2 of the indexing dial. This is illustrated in FIG. 10. Dial 24 then indexes another 15° clockwise. A third part 10 is next ejected from Position E into pocket P3 of the indexing dial. This is illustrated in FIG. 11. Dial 24 then indexes another 15° clockwise. A fourth part 10 is then ejected from Position B into pocket P23 of the indexing dial 24. This is illustrated in FIG. 12. Dial 24 then indexes another 15°. A fifth part 10 is then ejected from Position D into pocket P24 of the indexing dial. This is illustrated in FIG. 13. Dial 24 then indexes another 15°.

The sequence just described is then repeated in a second cycle as dial 24 continues to index the steps of 15° each. In this second cycle, a part from Position A is ejected into pocket P20; then a part from Position C is ejected into pocket P21; then a part from Position E is ejected into pocket P22; then a part from Position B is ejected into pocket P18, and finally a part from Position D is ejected into pocket P19; this completes the second cycle. The sequence is then repeated in a third cycle and a fourth cycle. The fifth cycle is modified, as will be mentioned, since there are only four pockets to be filled.

Figure 14:
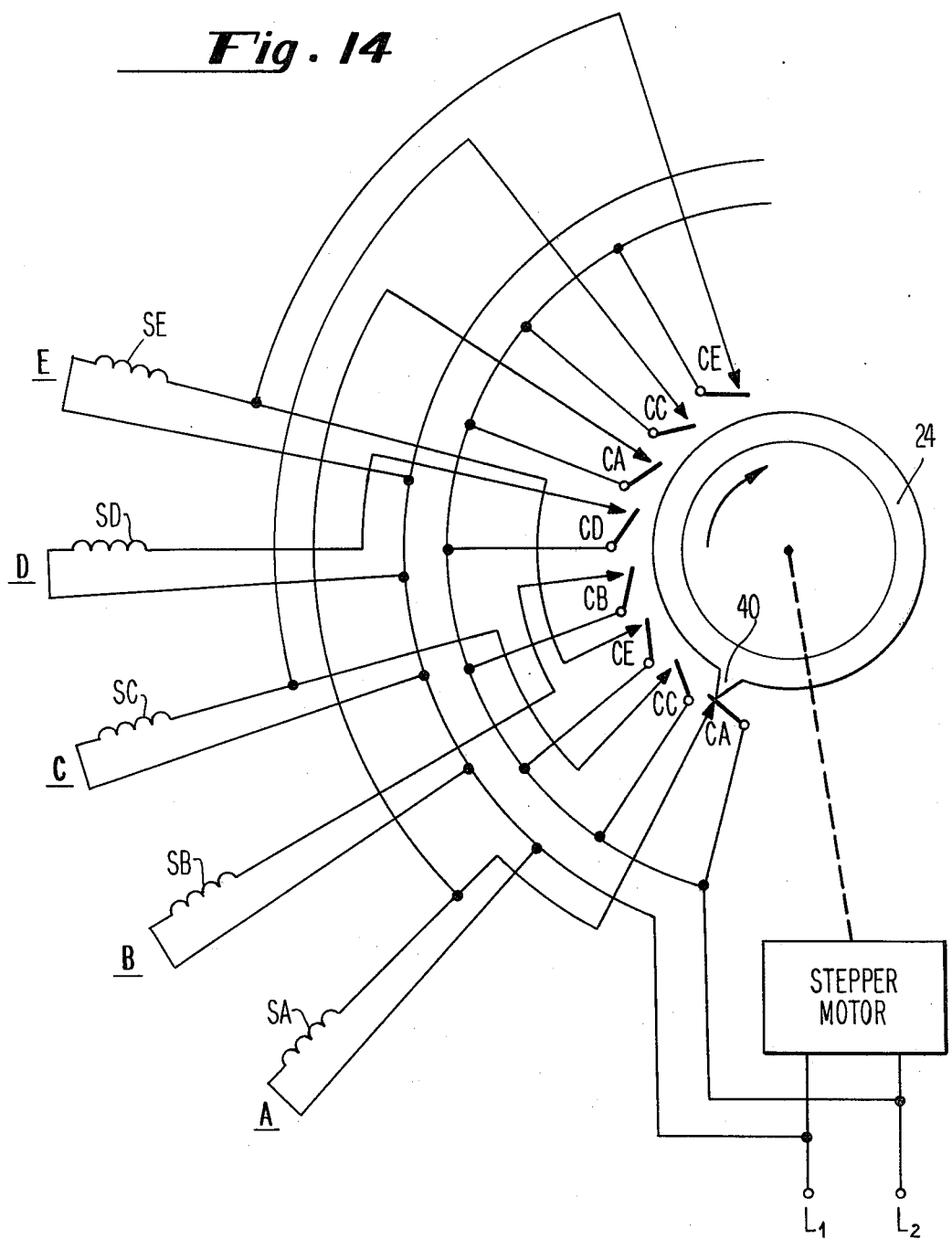
FIG. 14 is a schematic circuit diagram to illustrate one form of control of the ejection solenoids.

FIG. 14 is a schematic diagram of one form of control circuit which may be used to achieve the sequential and cyclic action described above. In FIG. 14, index dial 24 is provided with a cam lobe 40 which, during rotation of the dial, is adapted to engage in sequence, one at a time, a plurality of micro-switches which are provided at the periphery of the dial. These micro-switches are in groups of five, identified CA, CC, CE, CB and CD, and each is connected to and is adapted when closed to energize one of five solenoids SA, SC, SE, SB and SD, respectively. Each of those solenoids is associated with one of the five ejection fingers at the five stations A, C, E, B and D, respectively. Energization of one of the solenoids causes extension of one of the fingers and ejection of one of the parts into one of the dial pockets 1, 2, 3, 23 and 24, respectively, as described hereinbefore.

After the completion of activation of the first group of five solenoids, as cam lobe 40 continues its rotational movement, it encounters a second group of five switches similar to the first group and similarly identified. These switches are connected to and energize the same group of solenoids referred to above, in the same sequence, and as each is energized it causes ejection of a part into a previously empty pocket of the indexing dial.

Following completion of activation of the second group, the cam lobe encounters and activates a third group of five switches, and the action repeats. The action also repeats for a fourth group of five switches. The final group, i.e., the fifth group, has only four switches, as only four indexing position remain in the assumed 24 pocket dial.

As each part 10 is discharged from a staging tube 18, it will be projected, as just described, into one of the 24 pockets P of indexing dial 24. The number of pockets P on the dial 24 can, of course, vary depending upon the physical size of the dial. The particular dial being described is assumed to be set up for 24 pockets.

To confine the location of a part 10 after it is ejected from one of the staging tube positions A–E during one of the rapid indexing movements, a star-like construction 29 is employed which functions as a segregating means to assure that the ejected part 10 lands and stays in the desired pocket P and is not dislodged therefrom by the rapid acceleration and deceleration of the rapidly indexing dial 24.

Indexing dial 24 serves several functions in combination with merging block 19 and staging tube 18. One function is to merge a plurality of input systems (five are shown) and obtain one output flow equal in feed rate to the sum of the inputs. This output feed rate can, for example, range from 3 to 500 parts per minute. A second function of indexing dial 24 is to orient parts 10 so that all parts 10 being discharged from the dial are uniformly oriented. It will be recalled that the parts 10 are randomly oriented in the feed tubes 16.

Orientation of parts 10 is achieved by the design of the indexing dial pockets P and the centrifugal forces which are generated during the indexing motion. The floor of each pocket P is provided with a lengthwise slot 26 having on either side thereof ledge portions 27. The width of each slot 26 is dimensioned relative to the part 10 as to allow the smaller diameter of the part 10 to enter the slot while preventing the larger diameter of the part 10 from entering. The length of the slot 26 is dimensioned to allow the longer of the two smaller diameters to enter irrespective of whether the longer smaller diameter is facing radially inward or radially outward.

Figure 5:
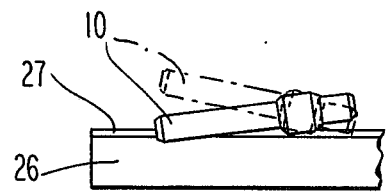
Figure 6:
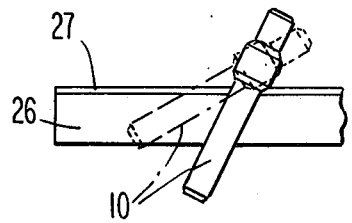

The orientation action just described is illustrated in FIGS. 4–7. In FIG. 4 the part 10 is beng ejected from the feeding stage into a pocket P of the indexing dial. In FIGS. 5 and 6, due to the radially outward centrifugal force developed by the indexing action, the longer smaller-diameter portion of the part 10 drops down into the slot 26 to take up the position shown in FIG. 7. In this position the larger diameter portion is supported on the inclined ledges 27 best seen in FIG. 3.

In its rapid indexing motion, dial 24 also creates a vibration which shakes parts 10 in the pockets P making the parts 10 unstable. This instability plays an important role in the attitude of the part in which the longer-shank smaller-diameter portion of the part drops down into the slot 26 and the part assumes the vertical position shown in FIGS. 3 and 7 in which the larger diameter portion is held by the inclined ledge portion 27.

Figure 7:
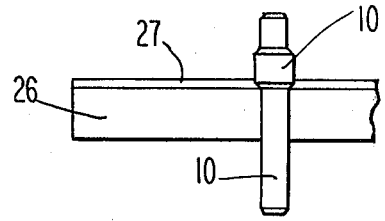

The interrupted rapid rotation of the dial 24, also subjects the parts, after they are vertically oriented as in FIG. 7, to centrifugal forces of limited magnitude which force the vertically-oriented parts 10 radially outward toward the outer periphery of the indexing dial. Once the parts reach the outer periphery of the dial 24, further outward movement is restrained by rings 28 until such time as a pocket P comes into radial alignment with discharge track 30.

Figure 8:
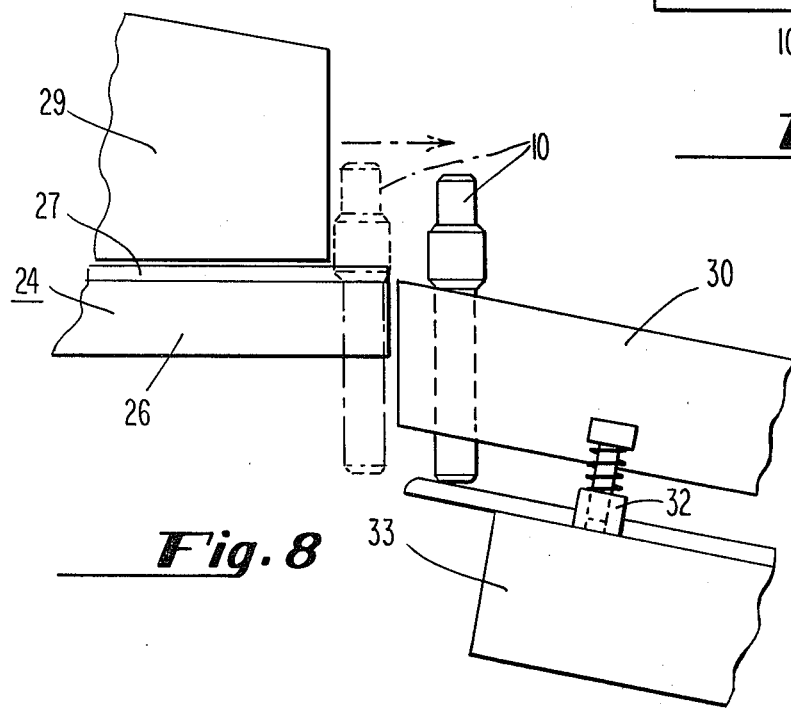

When a pocket P reaches discharge track 30, the centrifugal force, which is set up by the interrupted rotational movement of the indexing dial 24, ejects the part 10 from the dial onto the track 30 which guides the parts 10 to the threader or other production tool. Track 30 may be provided with a vibrating base 33, driven by vibrator 32, to insure that the parts 10 do not bind as they move along the discharge track. This is illustrated in FIG. 8.

It will be seen that according to the present invention the outputs of a plurality of feed tubes are merged by selective ejection of parts from the various individual tubes to fill all of the pockets of the multiple-pocket indexing dial without any pocket being missed and without ejecting two parts into the same pocket. The result is faster operation.

In FIG. 14, the indexing dial 24 is indicated as being actuated by a stepper motor. Other means may, however, be employed to actuate the indexing dial. Such other methods may include a Geneva motion indexing unit or a ratchet type indexing unit. The latter transforms a reciprocating linear motion into an intermittent rotary motion. Such units are commercially available.

The knock-out fingers 20 have been indicated as being actuated by electro-magnetic plungers or solenoids. Other methods of actuation may, however, be used including hydraulic or pneumatic cylinders and direct mechanical linkage using a power take-off from the main indexing drive which will provide both the power and the proper sequence for actuation of the knock-out fingers.

The timing of actuation of the knock-out fingers, and tha maintaining of the desired sequence, has been indicated as being achieved by micro-switches actuated by a lobe on the indexing dial. Other methods may, however, be employed, including the use of a proximity sensor to generate a pulsating signal at the instant that the pocket or dial opening reaches the sensor. Such signal may then be fed into a flip-flop control circuit to provide an output signal in desired preprogrammed sequence. The output signal may then be used either directly or indirectly to drive or actuate the solenoid plunger or to actuate the direction of a control valve to control the hydraulic or pneumatic cylinders or to control a shifting mechanism used in a direct mechanical linkage set-up.

On slower indexing machines, the timing and sequencing of the knock-out fingers may be accomplished with the use of multiple cams stacked on the main shaft of the indexing dial, each cam to correspond to a specific knock-out finger actuating device. The location of the lobes would correspond to the specific actuating sequence of the knock-out finger and indexing station or pocket of the indexing dial.

What is claimed is:

1. Apparatus for automatically orienting and feeding to a work machine elongated non-symmetrical parts having larger-diameter and smaller-diameter portions, said apparatus including:
   a. an intermittenly rotatable indexing dial having a plurality of radial pockets;
   b. a plurality of feed tubes, each tube adapted for carrying a plurality of randomly oriented non-symmetrical parts aligned end-to-end and for delivering said parts to the periphery of said indexing dial, the number of feed tubes being substantially smaller than the number of pockets in said indexing dial;
   c. ejection means at the delivery end of each feed tube for selectively ejecting an individual part from a feed tube into a pocket of said indexing dial;
   d. means in each pocket for effecting orientation of a part received therein; and
   e. means for discharging said oriented parts from said pockets successively one at a time into a discharge track for feeding said oriented parts to a work machine.

2. Apparatus according to claim 1 wherein said orientation means includes an elongated slot in the floor of said pocket whose sides are defined by ledge means spaced apart by such dimension that said larger-diameter portion of said part is supported on said ledge means whereas said smaller-diameter portion enters said slot.

3. Apparatus according to claim 2 wherein said ejection means comprises a normally-retracted ejection finger at the delivery end of each feed tube, said finger adapted to be actuated for movement in a radially inward direction toward a pocket of said dial, said finger in so moving being adapted to strike and eject a vertically oriented part at the delivery end of said feed tube.

4. Apparatus according to claim 3 wherein said ejection means included finger-actuation means, and means for actuating said finger-actuation means in selected sequence.

5. Apparatus according to claim 4 wherein said finger-actuation means includes a solenoid for each ejection finger, and electric switch means actuable by cam means on said indexing dial.

6. Apparatus according to claim 4 wherein resilient anti-bounce receiving means are provided at the delivery end of each feed tube for receiving the next succeeding part following ejection of a preceding part.

7. Apparatus according to claim 6 wherein adjustment means are provided for adjusting the vertical level of said anti-bounce receiving means.

8. Apparatus according to claim 7 wherein vibration means are provided for vibrating said discharge track.

9. Apparatus according to claim 8 wherein said plurality of feed tubes includes at least five tubes, and said selected sequence of actuation of said ejection fingers is 1-3-5-2-4.

10. Apparatus according to claim 9 wherein said dial has 24 pockets and each indexing step is 15°.

11. Apparatus for automatically feeding parts to a work machine, said apparatus including:
   a. an indexing dial having a plurality of radial pockets;
   b. means for rotating said dial intermittently in step-by-step fashion;
   c. a plurality of feed tubes each adapted for carrying a plurality of parts aligned end-to-end and for delivering said parts to the periphery of said indexing dial, the number of feed tubes being substantially smaller than the number of pockets in said indexing dial;

d. ejection means at the delivery end of each feed tube for ejecting an individual part from a feed tube into a pocket of said indexing dial;
e. selective means for actuating said ejection means in predetermined sequence to effect insertion of one part only into each pocket of the dial as the dial rotates; and
f. means for discharging said oriented parts from said pockets successively one at a time into a discharge track for feeding said oriented parts to a work machine.

12. Apparatus according to claim 11 wherein said dial pockets include structural means for effecting orientation of a part inserted therein.

* * * * *